July 25, 1944. H. H. SANDERS 2,354,616
DRESSING MACHINE FOR PIPE WRENCH PARTS
Filed Sept. 24, 1942 3 Sheets-Sheet 2
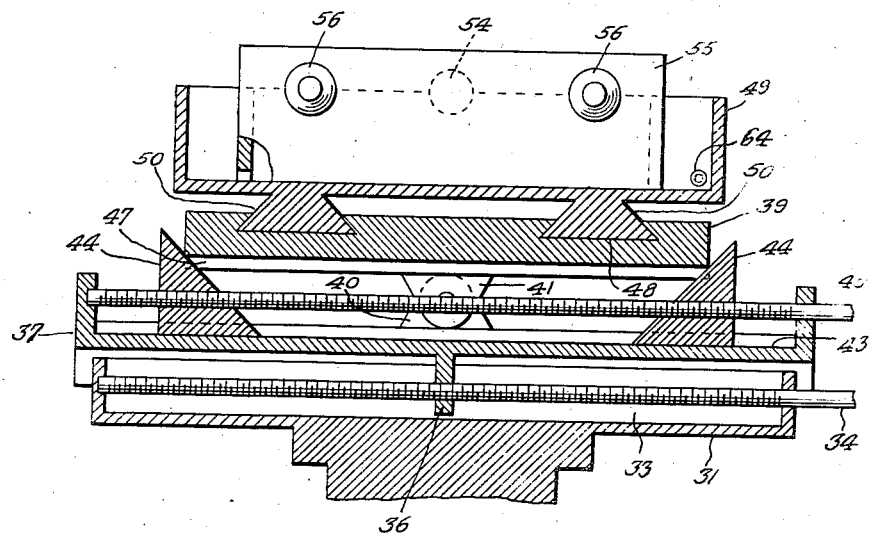
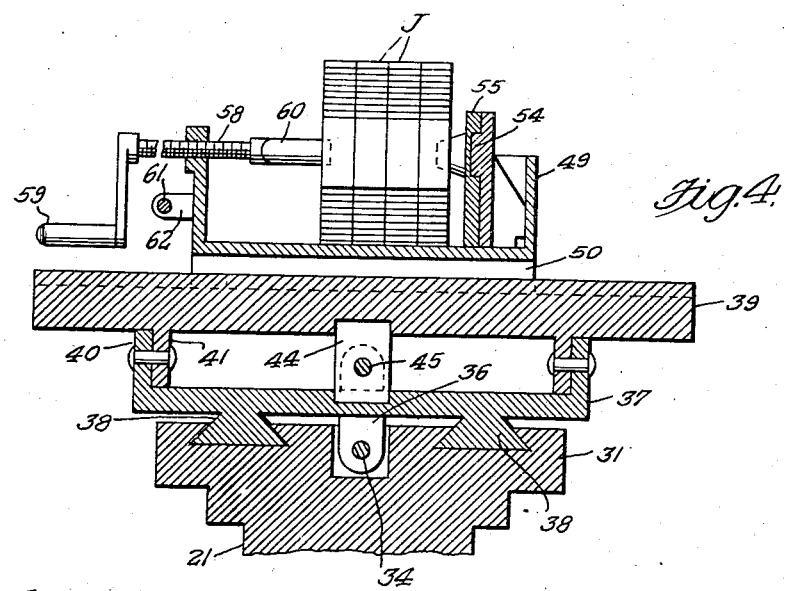
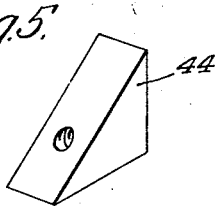
Inventor
Henry H. Sanders
By A. D. Adams
Attorney July 25, 1944. H. H. SANDERS 2,354,616
DRESSING MACHINE FOR PIPE WRENCH PARTS
Filed Sept. 24, 1942 3 Sheets-Sheet 3

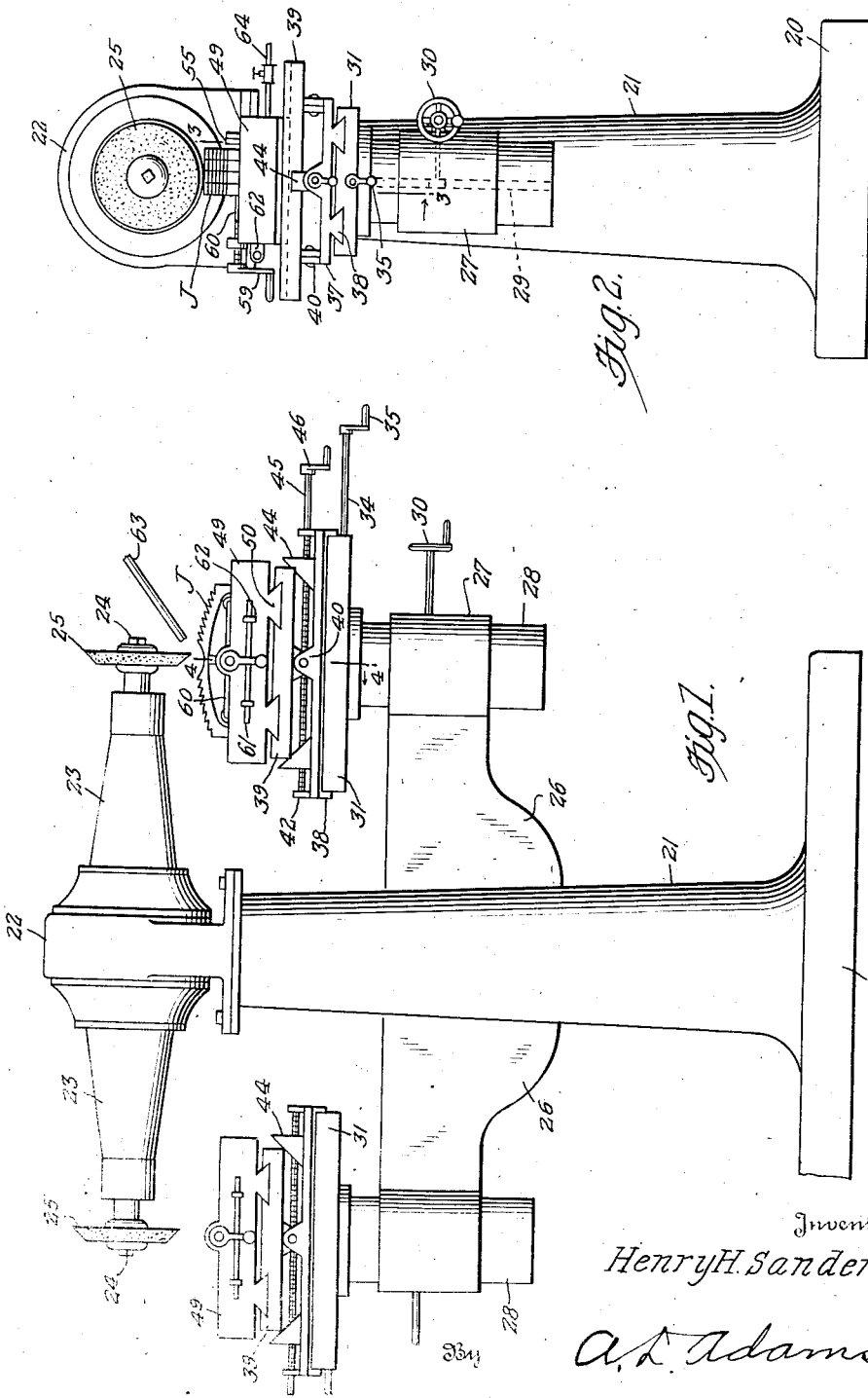

Inventor
Henry H. Sanders
By A. D. Adams
Attorney

Patented July 25, 1944

2,354,616

UNITED STATES PATENT OFFICE 2,354,616

DRESSING MACHINE FOR PIPE WRENCH PARTS

Henry H. Sanders, Nederland, Tex.

Application September 24, 1942, Serial No. 459,467

5 Claims. (Cl. 51—92)

This invention relates to tool dressing machines of the type adapted to dress or recut the jaw parts of pipe wrenches, pipe vises and the like and, among other objects, aims to provide a greatly improved and simplified machine employing a rotary cutter or emery wheel for renewing the teeth or linear gripping edges of such tool parts. The idea is to provide a machine of this type which is capable of producing gripping teeth of a different shape or contour from those originally formed on the tool parts. Another aim is to provide a machine wherein a multiplicity of pipe wrench jaws and the like may be clamped with their teeth properly aligned in a work support which is mounted for easy tilting adjustment and which is capable of manual operation so that the work may be reciprocated with respect to the grinding wheel. Another aim is to provide a machine of this type which is capable of recutting the teeth on pipe wrenches and vise parts without annealing them or destroying their temper. The invention also contemplates a simple machine for re-shaping worn teeth of tempered jaw parts to improve their grip, prolong their life and insure easy release.

Other aims and advantages of the invention will appear in the specification, when considered in connection with the accompanying drawings, wherein:

Fig. 1 is a front elevation of a duplex machine embodying the invention;

Fig. 2 is a side elevation of the machine shown in Fig. 1;

Fig. 3 is a sectional view of the work table and support taken on the line 3—3 of Fig. 2;

Fig. 4 is a sectional view taken on the line 4—4 of Fig. 1;

Fig. 5 is a perspective view of a tilting block or wedge member for the work table;

Figure 6:
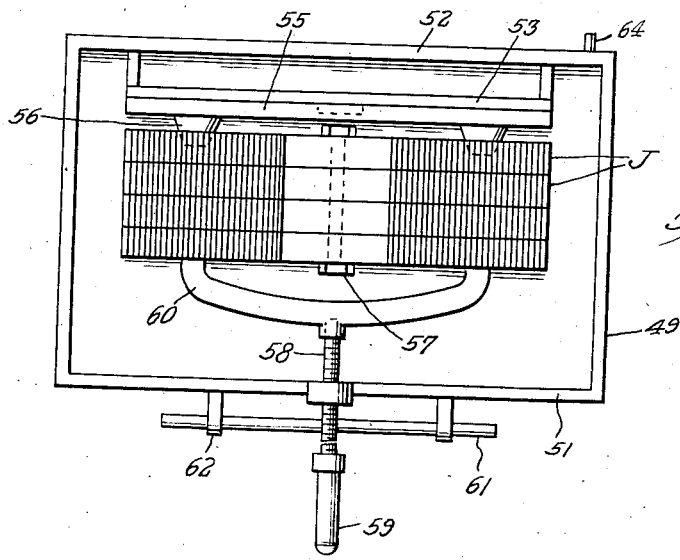
Fig. 6 is a top plan view of the work table.
Figure 7:
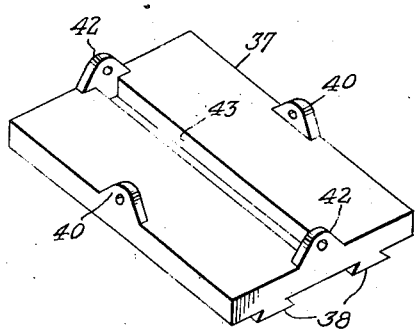
Figs. 7, 8 and 9 are perspective views of the work table supports or bases.
Figure 8:
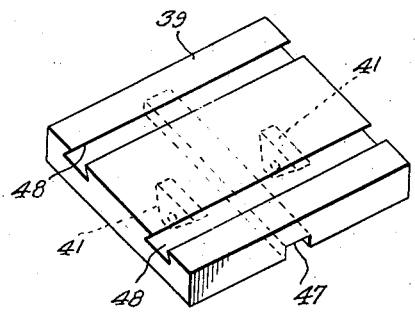
Figure 9:
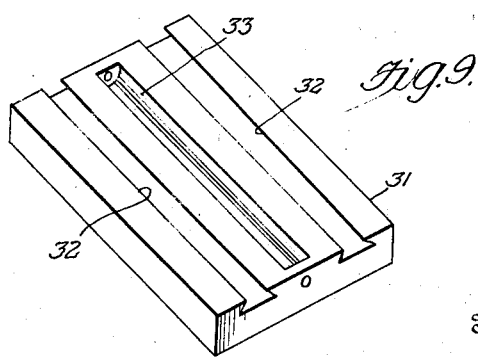

Referring particularly to the drawings, the preferred type of machine shown therein embodies an ordinary base or support 20 having a vertical standard 21 on the top of which is supported a motor 22 carrying opposite arms or housings 23 through which shafts 24 project. The shafts are shown as carrying removable cutters 25 in the form of emery wheels shaped to correspond with the desired contour of the teeth to be dressed. The vertical support 21 is shown as carrying side arms 26 in which the work tables are adjustably supported. In this instance, each arm is shown as having a socket 27 within which the work table is adjustably supported by means of a stem or vertical post 28 which carries a rack gear 29 so that it can be adjusted by means of a hand wheel 30 operating suitable gearing (Fig. 2), the arrangement being such that the work table will remain adjusted when it is raised or lowered by operating the hand wheel. Each post carries a fixed base member 31 provided with a pair of dovetail guide channels 32 and a channel or groove 33 for a screw shaft 34 having an operating handle 35 which is connected to or threaded in an ear or depending lug 36 on a slidable base member 37. The slidable base or intermediate member 37 is shown as having dovetail tongues 38 mounted in the grooves 32 of the stationary base member 31. The arrangement is such that the slidable base member reciprocates parallel with the arm on which the work support is mounted or transversely of the rotating cutter so that the work may be adjusted by the hand wheel or handle 35 to cut the teeth.

The slidable, intermediate base member 37 is shown as having means for supporting a tiltable base 39 to rock transversely of the plane of the rotating cutter. In this instance, the base 37 is shown as having a pair of opposite upstanding ears 40 on which are pivotally mounted a pair of depending ears 41 on the tilting base 39. Also, the sliding base 37 carries opposed upstanding ears 42 at the opposite ends of a longitudinal channel 43. In this instance, the tilting base 39 is narrower than the slidable base and a pair of opposed wedge blocks 44 is shown as being slidably mounted in the longitudinal channel 43 and are arranged to be operated in the same direction by a screw threaded spindle 45 having a hand wheel or crank 46. These wedge blocks are shown as engaging the lower opposite ends of the tilting base 39 in the ends of an undercut groove 47, the idea being to prevent the tilting base member from being twisted or turned laterally on its pivots in the ears 40 and 41. The tilting base member 39 is also shown as having a pair of dovetail grooves or guides 48 carrying the work support or table, herein shown as being in the form of a cast metal box 49 having dovetail tongues 50 mounted in said guides.

The work support is here shown as being generally rectangular having front and rear side walls 51 and 52. The depth is sufficient to carry a cooling liquid such as water, within which a portion of the work is adapted to be submerged while it is being dressed. The rear wall 52 is shown in Figs. 4 and 6 as having a fixed abutment plate 53 to facilitate clamping the jaws of chain tongs and the like in the support. The inner face of the abutment plate is shown as having a projection 54 to receive a removable clamping plate 55 properly centered with respect to it and having a pair of frusto-conical dowels or projections 56 shaped to engage the depressions or bushing holes usually provided in one side of every duplex chain tongue jaw. It will be understood that different removable clamping plates having dowel pins will be provided for duplex chain tongue jaws wherein the spacing of the bushing holes are different from those here shown. In fact, a set of such plates will be provided for all sizes of duplex chain tongue jaws to be dressed.

Referring to Figs. 4 and 6, it will be noted that four duplex chain tongue jaws J are shown as being clamped in the work carrier or support. They are bolted together by an ordinary bolt 57 passing through openings provided in the jaws. The two outside jaws are so arranged that the bushing openings are on the outside. The clamp jaws are shown as being held in place by a clamping screw 58 having an operating handle 59. The inner end of the clamping screw removably engages a yoke or fork member 60 which has fingers spaced to engage in the bushing openings on the front jaw. When the work is clamped in this position, all of the teeth will be matched so that they will be aligned with respect to the cutting or emery wheel 25. The front wall 51 of the work carrier is shown as having a manipulating handle 61 secured in forwardly projecting lugs 62 so that the work table can be reciprocated manually or back and forth under the rotary cutter or emery wheel.

In this instance, water is directed against the work through a hose 63 to keep the jaws cool while the machine is being operated. Water is adapted to be drained out of the box 49 through a valved outlet 64 and may run to an ordinary sewer or drain.

It will be understood that the work support has provision for clamping different types of jaws, vise parts, heels and the like to be dressed. In Fig. 10, there is shown an enlarged side elevation of a duplex jaw 65 having dressed teeth 66 on its upper side. The teeth 67 on lower side are the ones originally formed on the jaw which require redressing after they become worn. Fig. 11 shows an ordinary Stillson wrench hook or movable jaw 68 and an insert heel or jaw part 69 cooperating with it. The teeth correspond with those originally formed on these parts. Fig. 12 shows the same parts as in Fig. 11, with the teeth after they are dressed. Figs. 13 and 14 show a center heel of a duplex chain wrench employing jaws similar to that shown in Fig. 10. The teeth in Fig. 13 are the originals and those in Fig. 14 are dressed on the machine. Fig. 15 shows a single chain wrench jaw 71 of the Vulcan type having teeth on one end at the opposite side edges. The teeth on the left hand side are the originals; while those on the right hand side are dressed on the machine.

The preferred form of cutting wheel 25 is composed of emery or the like of 80-0 fineness. If the wheel is 6 inches in diameter, the speed is preferably about 3500 R. P. M.; but the speed may vary between 3000 and 4000 R. P. M.

Referring now to the operation of the machine, the work is clamped in place in the work support or carrier with the teeth on the separate pieces properly aligned. The work table is lowered below the cutter or wheel and the sliding bed 37 is adjusted by the hand wheel 35 until the tooth to be cut is properly aligned with the grinding edge of the wheel. In the example shown in Fig. 1, the work carrier is preferably adjusted so that the first tooth to the left of the center of the duplex jaw is aligned with the wheel. Then the post or standard 28 is raised and adjusted by the hand wheel 30 until the work is brought into cutting engagement with the wheel. The work holder is tilted to the proper angle by means of the handle 46, which adjusts the opposite wedges 44. The work holder is then pushed rearwardly by grasping the handle 61 so that the edge of the wheel takes its first cut in the first tooth. Then, the carrier is pulled forwardly until the jaws pass the cutter or wheel and the hand wheel 30 is again turned slightly to raise the work so that the wheel will take a deeper or further cut. The process is repeated until the dressed tooth is cut to the desired depth. While this work is in progress, cooling water is delivered against the work or surface of the jaw being dressed. After the first tooth is dressed properly, the work table is adjusted laterally by the hand wheel or crank 46 so that the next adjacent tooth is brought into proper alignment or position with respect to the cutter or wheel. When there is danger of overheating the jaws, the work table may be adjusted so that, after finishing the first tooth on the left hand side of the center, the wheel will engage the last tooth on the left hand side. After this is done, the work holder is tilted by operation of the hand wheel 46 so that the extreme left hand tooth is cut properly. The process may be repeated by shifting the work back and forth and skipping teeth until all of the teeth on the left hand side of the center are dressed, without unduly heating the teeth and taking the temper out of them.

When all of the teeth on the left hand side of the center, as shown in Fig. 1, have been dressed, the jaws may be removed from the work clamp and turned over so that a new group of worn teeth will appear on the left hand side and the work will be again clamped in position. The process is repeated until all of the teeth have been dressed. When the wheel becomes worn, it may be redressed by the well known type of wheel dressing tool without removing it from its arbor.

It has already been explained that the clamping members, best shown in Fig. 6, for holding duplex chain wrench jaws, are designed to engage jaws of different sizes. It will be understood that the clamping means may be varied or modified in a well known manner to engage a group of jaws.

Obviously, the present invention is not restricted to the particular embodiment thereof herein shown and described. Moreover, it is not essential that all the features of the invention be used conjointly, since they may be employed advantageously in various combinations and subcombinations.

What is claimed is:

1. In a machine for dressing jaw parts of pipe wrenches and the like, a dressing wheel mounted on a horizontal spindle and having a V-shaped dressing edge; a work table below the dressing wheel having means to adjust it vertically to raise and lower the work; a base member slidably mounted on the table for movement across the plane of the wheel; manual means for adjusting the slidable base; a tiltable base pivotally mounted on the slidable base member having its pivotal axis parallel with the wheel spindle; manually operable means carried by the slidable base and connected to tilt said tiltable base at various angles relative to the plane of the grinding wheel; a work supporting member slidably mounted on the tiltable base to move back and forth under the grinding wheel in a plane parallel with the pivotal axis of the tiltable base; jaw clamping devices carried by the work supporting member; and a handle on the work supporting member, whereby it may be manually moved back and forth to bring the work into dressing engagement with the wheel.

2. In a machine for dressing jaw parts of pipe wrenches and the like, a dressing wheel mounted on a horizontal spindle and having a V-shaped dressing edge; a work table below the dressing wheel having means to adjust it vertically to raise and lower the work; a base member slidably mounted on the table for movement across the plane of the wheel; manual means for adjusting the slidable base; a tiltable base pivotally mounted on the slidable base member having its pivotal axis parallel with the wheel spindle; manually operable means carried by the slidable base and connected to tilt said tiltable base at various angles relative to the plane of the grinding wheel; a work supporting member including a box-like receptacle slidably mounted on the tiltable base to be reciprocated under the wheel in a plane parallel with the pivotal axis of the tiltable base; jaw clamping members removably mounted within the box-like receptacle for engaging the work; and manual means connected to said receptacle for reciprocating the work relative to the wheel.

3. A machine of the type set forth in claim 1, wherein the means for tilting the tiltable base and adjusting the work angularly to the dressing wheel comprise oppositely movable wedge-shaped members slidably mounted on the slidable base member and an adjusting screw connected to operate the wedges.

4. A machine of the type set forth in claim 2, wherein the box-like receptacle is designed to hold a cooling liquid partially submerging the work and the cooling liquid is introduced into the receptacle over the top of the work.

5. A machine of the type set forth in claim 2, wherein the box-like receptacle is adapted to be partially filled with water supplied thereto over the work and a valved drain pipe is connected to the bottom of the receptacle.

HENRY H. SANDERS.